W. W. Hubbard.
Turning Lathe.
Nº 16,118.  Patented Nov. 25, 1856.
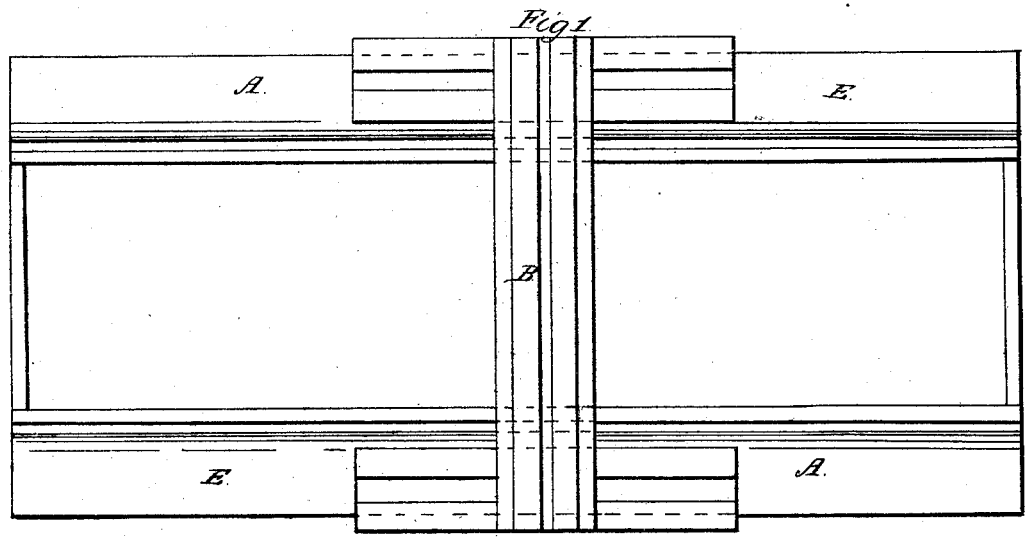
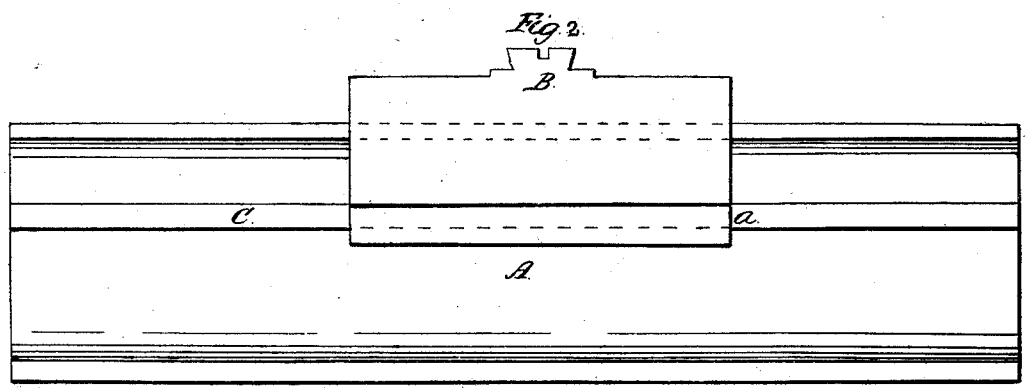
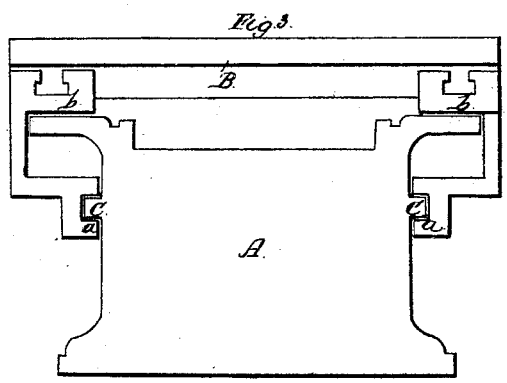

UNITED STATES PATENT OFFICE.

WILLIAM W. HUBBARD, OF BOSTON, MASSACHUSETTS.

LATHE FOR PLANING METAL.

Specification of Letters Patent No. 16,118, dated November 25, 1856.

*To all whom it may concern:*

Be it known that I, WILLIAM W. HUBBARD, of Boston, in the county of Suffolk and State of Massachusetts, have invented a new and useful Improvement in Lathes; and I do hereby declare that the same is fully described and represented in the following specification and the accompanying drawings, of which—

Figure 1, denotes a top view. Fig. 2, a front elevation, and Fig. 3, an end view of a lathe frame and carriage having my improvement.

The nature of my invention is to be found in the peculiar manner in which the supporting slides of the tool carriage are arranged on their frame and protected from dust or shavings.

In the drawings, A, may be supposed to represent the bed or frame of an engine lathe for turning or planing metal, the same serving to sustain a tool carriage B, which during its operation moves from end to end of the bed or frame, and is applied by rails or slides C, C, arranged on and propecting from the vertical external sides or surfaces of the frame as seen in the drawings. For this purpose, the carriage is formed so as to extend down and toward the opposite sides of the frame and to embrace the said rails or slides, as shown at *a*, *a*. It is also constructed so as to project down below and underneath guards or coverers, E, E, made to extend from the upper part of the frame and from each side of it as shown in the drawings.

The guards or coverers, E, E, serve to protect the slides from chips, and dust or extraneous matters, which during the operation of the lathe are produced by it, and generally fall upon the slides, when they are arranged on and made to project above the top surface of the frame or bed. When the slides are thus arranged and protected (that is disposed on the sides of the frame and underneath projecting shelves or guards) an easy and accurate movement of the tool carriage is insured.

It is well known that during the operation of turning metallic castings, particles of sharp scale and sand are removed with the chips and dirt. These often prove very destructive to the slides under the ordinary arrangement of them, as by accumulating and resting on the bearing surfaces of the slides they serve to wear them and the feet or supporting parts of the tool carriage during the movement of the latter. Besides this, they cause the carriage to move hard or with friction, whereby the slides soon become worn so as to make the carriage run untrue, all of which difficulties are overcome by my improvement. Furthermore I would remark, that the parts, *b*, *b*, (of the tool carriage) which come directly over the top surfaces of the guards, should be elevated a short distance above them in order that, dust or chips that may lie or collect on the guards, may present no obstruction to the correct movements of the tool carriage.

Under the common method of arranging the slide rails of a lathe, it is customary for the workmen or attendants to lay their tools on them, or to allow bars of iron or other articles of metal to fall on them. In this way the slides soon become more or less scratched, indented or otherwise injured, such injuries tending, sooner or later, to affect the correct operations of the lathe.

I claim—

Arranging the tool carriage slides or supports on the vertical sides of the frame or bed, in combination with arranging above such slides and so as to project from the sides of the frame and over the slides substantially as above explained, coverers or guards whereby the slides are protected from dust, chips or other matters as specified.

In testimony whereof I have hereunto set my signature this 29th day of September, 1856.

WILLIAM W. HUBBARD.

Witnesses:
R. H. EDDY,
F. P. HALE, Jr.